US006451865B1

(12) United States Patent
Migchels et al.

(10) Patent No.: US 6,451,865 B1
(45) Date of Patent: Sep. 17, 2002

(54) FOAM COMPOSITION COMPRISING OIL, THERMOPLASTIC ELASTOMER AND EXPANDABLE PARTICLES

(75) Inventors: Peter Migchels, Louvain-la-Neuve (BE); Olivier Roumache, Louvain-la-Neuve (BE)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 09/485,545

(22) PCT Filed: Oct. 30, 1998

(86) PCT No.: PCT/EP98/07016

§ 371 (c)(1),
(2), (4) Date: Feb. 14, 2000

(87) PCT Pub. No.: WO99/23144

PCT Pub. Date: May 14, 1999

(30) Foreign Application Priority Data

Oct. 31, 1997 (EP) ............................................. 97308748

(51) Int. Cl.⁷ .............................. C08J 9/32; B01J 13/02
(52) U.S. Cl. ........................... 521/54; 521/98; 521/139; 521/140
(58) Field of Search ........................... 521/54, 98, 140, 521/139

(56) References Cited

U.S. PATENT DOCUMENTS

| 3,231,635 A | 1/1966 | Holden et al. ............... 260/880 |
| RE27,145 E | 6/1971 | Jones ........................ 260/880 |
| 3,615,972 A | 10/1971 | Morehouse, Jr. et al. ..... 156/79 |
| 3,700,633 A | 10/1972 | Wald et al. ............. 260/880 B |
| 4,174,358 A | 11/1979 | Epstein ........................ 525/183 |
| 4,427,828 A | 1/1984 | Hergenrother et al. ........ 525/66 |
| 4,429,076 A | 1/1984 | Saito et al. ................... 525/57 |
| 4,483,889 A | 11/1984 | Andersson ................ 427/389.9 |
| 4,628,072 A | 12/1986 | Shiraki et al. ................. 525/57 |
| 4,657,971 A | 4/1987 | Shiraki et al. ................. 525/57 |
| 4,764,572 A | 8/1988 | Bean, Jr. ....................... 526/87 |
| 4,844,471 A | 7/1989 | Terence et al. ............. 273/220 |
| 5,039,755 A | 8/1991 | Chamberlain et al. ....... 525/338 |
| 5,194,530 A | 3/1993 | Stevens et al. ................ 526/82 |
| 5,272,236 A | 12/1993 | Lai et al. .................. 526/348.5 |
| 5,299,464 A | 4/1994 | Bennett .................... 73/864.74 |
| 5,322,728 A | 6/1994 | Davey et al. ................ 428/296 |
| 5,626,657 A | 5/1997 | Pearce ......................... 106/122 |
| 5,780,523 A * | 7/1998 | Petit et al. .................... 521/140 |
| 6,169,138 B1 * | 1/2001 | Petit et al. .................... 521/140 |

FOREIGN PATENT DOCUMENTS

| EP | 0085115 a1 | 8/1983 | ............ C08L/53/02 |
| EP | 0103148 A1 | 3/1984 | ............ C08L/77/00 |
| EP | 0200822 A1 | 11/1986 | ............. B68G/1/00 |
| EP | 0215501 A2 | 3/1987 | .............. C08F/8/04 |
| EP | 0216347 A1 | 4/1987 | ............ C08L/51/00 |
| EP | 0262691 A2 | 4/1988 | ......... C08F/287/00 |
| EP | 0349085 A2 | 1/1990 | ......... C08F/287/00 |
| EP | 0450694 A2 | 10/1991 | ............. C08F/8/00 |
| EP | 0458379 A2 | 11/1991 | ......... C08F/297/02 |
| EP | 0540109 A1 | 5/1993 | ............ C08G/81/02 |
| EP | 0653449 A1 | 5/1995 | ......... C08F/297/04 |
| EP | 0653453 A1 | 5/1995 | ......... C08G/81/02 |
| EP | 0717091 A2 | 6/1996 | .............. C09J/5/08 |
| WO | WO 97/12930 | 4/1997 | .............. C08J/9/32 |

* cited by examiner

Primary Examiner—Morton Foelak

(57) ABSTRACT

A foam and pre-foam production process, and a foam and a pre-foam is described. The process comprises the steps of: forming a pre-foam composition comprising oil(s), thermoplastic elastomer(s) and heat expandable thermoplastic particles encapsulating heat expandable gas or liquified gas, the said particles being present in an amount which provides the required foam cell density. A heat treating step for the said composition to cause the particles to expand and produce a foam from the said composition is also described.

16 Claims, 2 Drawing Sheets

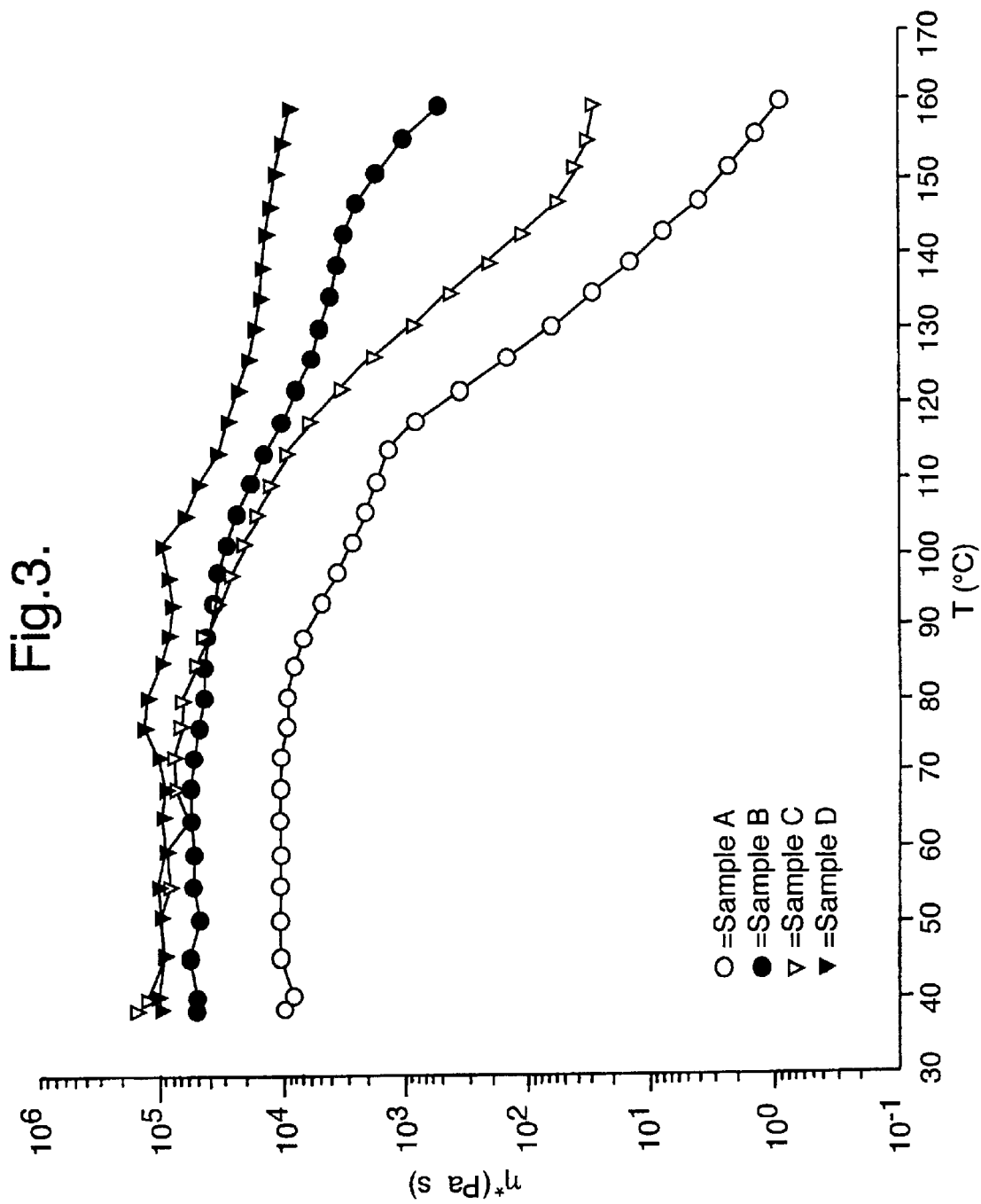

Figure 1:
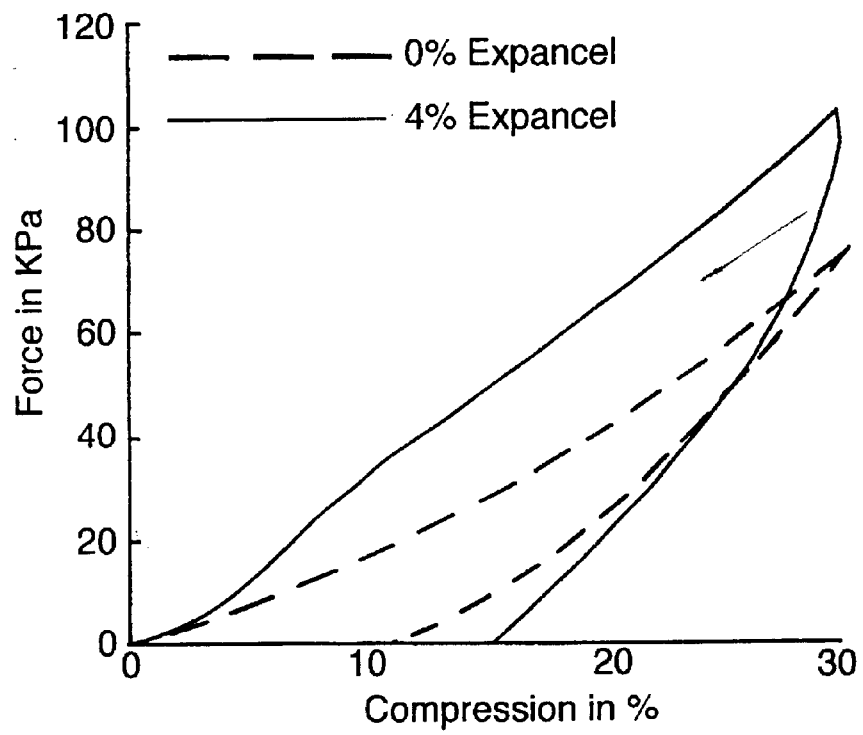

FOAM COMPOSITION COMPRISING OIL, THERMOPLASTIC ELASTOMER AND EXPANDABLE PARTICLES

The present invention relates to a foam composition, a pre-foam composition and process for the production of foams and pre-foam compositions.

Oil gel compositions are generally useful as filling compounds in wire and cable applications. Their properties include slump resistance at high service temperatures, strippability and good working viscosity. The oil gels need strippability so that installers and repair men can make electrical splices easily in the field. A good working viscosity is required so that the oil gel melt or solution can be easily pumped into the cable. Other characteristics of oil gels include compatibility with other components in the cable system and a lack of stiffness so that they do not add to the stiffness of the cable.

These oils gel compositions are also well suited for re-enterable sealing of electrical connections. Other end uses for these oil gel compositions include vibration damping, pressure relief, toys, cushioning, grips, therapeutic and orthopaedic devices.

Due to their extremely low melt (or solution) viscosity, oil gels lead to a diffusion of gas bubbles when the oil gel is mixed with a chemical blowing agent and heated above the blowing temperature. The diffusion of gas bubbles causes a failure to produce a foamed structure. Furthermore, oil gels are often used for their "self-healing" properties, ie when an oil gel is punctured or torn, the gel structure reforms after a short time leaving no visual traces. However, the "self-healing" properties of an oil gel would also lead to a destruction of any foamed structure once the foamed structure is put under any pressure. For this reason, oil gels have not been considered for foam applications.

However, in accordance with the invention, it has been discovered that the use of heat expandable hollow particles such as microspheres prevents collapse of the foam structure. Furthermore, it has surprisingly been found that the low melt or solution viscosity of the oil gel materials is advantageous in allowing blending of the oil gels with the heat expandable hollow particles and by blending a homogenous distribution of the particles can be attained. Furthermore, the low melt or solution viscosity of the oil gels allows the use of a low temperature blending process which maximises the utility of the hollow expandable particles which are prone to collapse above the expansion limit temperature.

WO9712930 describes a manufacturing method for a padding element used as an interior component of a motor vehicle which comprises moulding the padding element from a mixture of microspheres and a plasticised thermoplastic material matrix. The microspheres are formed from plastic shells filled with gas or liquified gas. In addition EP0717091 describes a pressure sensitive adhesive foam which comprises a thermoplastic block co-polymer, tackifying resin, isocyanate terminate monomer, polymer, and expandable articulate materials. However, none of these documents addresses the problems associated with foaming oil based compositions of low melt or solution viscosity.

U.S. Pat. No. 5,626,657 defines a composite mixture which comprises spheres having a lubricant of viscoelastic fluid on the surface. The lubricant or viscoelastic fluid comprises a main lubricant and elastomeric polymer and is present in a quantity less than that which would cause dispersion of the spheres with significant separation from one another by the lubricant. Spheres flow in low friction sliding and rolling contact with each other in response to a deforming pressure, where the lubricant reduces the co-efficient of friction between the spheres. Again, the document does not address the problem of producing foam from an oil based composition.

EP-200822 describes a cushioning article which comprises a closed flexible envelope containing a quantity of discreet, relatively-moveable, gas-filled enclosures bounded by respective permanent flexible walls. A lubricant is provided to facilitate the relative movement of the gas-filled enclosures within the envelope. Articles of this type are said to follow body contours of a user, distribute pressure evenly and provide greater comfort, as well as reduce hardness. Again, this publication does not address the production of foams from oil based compositions of low viscosity.

According to one aspect of the present invention, there is provided a process for producing a foam comprising the steps of:

forming a pre-foam composition comprising oil(s), thermoplastic elastomer(s) and heat expandable thermoplastic particles encapsulating heat expandable gas or liquified gas;

heat treating the said composition to cause the said particles to expand and produce a Loam from the said composition.

Preferably, the thermoplastic elastomer(s) is/are present in an amount of 2–40% by weight of the pre-foam composition, more preferably, 8–25% by weight of the pre-foam composition.

Preferably, the said heat expandable thermoplastic particles are present in an amount of 0.5–6% by weight of the pre-foam composition, more preferably, 1–4%, most preferably, at least 2% by weight of the pre-foam composition.

Preferably, the oil(s) is/are in a range of 54–97% by weight of the pre-foam composition.

Typically, the thermoplastic elastomer(s) is/are present in an amount which gives a viscosity to the oil gel melt or solution which allows dispersion of the particles in the melt or solution but substantially prevents migration thereof towards the surface during cooling.

Preferably, the oil/thermoplastic elastomer melt or solution viscosity is in the range of typical oil gels, that is in the range from 50 to 100,000, preferably 200 to 30000 Pa.s at 120° C.

In the process of the invention, typically, the composition forms a melt during said heat treating step or prior to the said heat treating step in a melting step.

Alternatively, but less preferably, the pre-foam composition can be prepared from an oil solution using a solvent or blends of solvents that assist dissolution of the thermoplastic elastomer but will not dissolve the heat expandable particles. Examples of suitable solvents include toluene, xylene, cyclohexane, methylethyl ketone, or combinations thereof.

Preferably, the process includes a particle dispersion step, prior to the heat treating step. Preferably, mixing of the components of the composition is continued until homogenous dispersion of the particles is achieved. Preferably, the particles are added to oil(s) and thermoplastic elastomer(s) beyond the glass transition temperature of the latter, or in case the thermoplastic elastomer(s) has (have) two glass transition temperatures, beyond the highest glass transition temperature.

Preferably, tackifying resin, wax(es), filler(s), solvents, and/or end block resin can be added to the composition in accordance with the end use.

Preferably, the oil(s) and thermoplastic elastomer(s) are present in the relative ranges of oil gels.

The invention also extends to a process for producing the pre-foam composition for subsequent heating and foam formation.

Still further aspects of the invention include a pre-foam composition comprising oil(s), thermoplastic elastomer(s) and the said particles, additionally comprising fillers, end block resin and/or solvents. The invention also extends to a foam produced from the said pre-foam composition. The invention may also be utilised in the formulation of adhesives, coatings and sealants comprising the foam or pre-foam composition.

Preferably, in the process according to the present invention, the oil and thermoplastic elastomer are heated beyond the glass transition temperature, or the highest glass transition temperature, of the thermoplastic elastomer and the said expandable particles are added to the melt. Preferably, the said particles are mixed with the melt until substantially homogenous distribution is achieved.

Preferably, in foam preparation, the composition is heat treated by being heated to a suitable expansion temperature for the hollow particles.

Preferably, the expansion temperature is above the melting point of the oil/thermoplastic elastomer system.

Preferably, the process expansion temperature of the particles is between 90–200° C., more preferably, 100–190° C., most preferably, 125–181° C. Preferably, the viscosity of the composition of the invention within the said temperature ranges is sufficiently low to allow homogenous dispersion of the said particles.

Processing temperatures, as detailed above, may be optimised within the above ranges to provide the optimum balance between the viscosity of the composition which gives homogenous dispersion of the said expandable particles and sufficient expansion of the said particles. Where the temperature is too low the viscosity of the melt hinders particle dispersion and may not be sufficient to cause sufficient expansion of the particles whereas a temperature too high may cause the maximum expansion temperature of the particles to be exceeded.

The particles may be any suitable shape such as spheres, ovals, prisms or other polyhedrons. Preferred shapes are spheres.

Preferably, the walls of the particles are made of any suitable material such as acrylic plastic or phenolic plastic. Further examples of suitable materials include copolymers of vinyl chloride and vinylidene chloride, copolymers of vinyl chloride and acrylonitrile, copolymers of vinylidene chloride and acrylonitrile, copolymers of styrene and acrylonitrile, copolymers of methyl methacrylate and up to 20 percent by weight of styrene, copolymers of methyl methacrylate and up to 50 percent by weight of ethyl methacrylate, and copolymers of methyl methacrylate and up to 70 percent by weight of orthochlorostyrene. In a particularly preferred embodiment the particles are microspheres available under the trade name of Expancel (Akzo-Nobel, Sweden). The walls of these microspheres are typically made of poly(vinylidene chloride-co-acrylonitrile).

Preferably, the microspheres have a thermoplastic shell encapsulating a gas or a liquid.

The liquid is typically a volatile organic liquid which vaporises when heat is supplied. Examples of such organic liquids include C4–C6 alkanes, in particular, n-butane, n-pentane and/or isomers thereof.

If a gas is applied, this is typically air or a non-reactive gas.

Typically, the unexpanded particles have a weight average diameter of between 1 and 50 $\mu$m, preferably between 2 and 30 $\mu$m, more preferably between 6 and 24 $\mu$m.

Generally, the expanded particles have a weight average diameter of less than 200 $\mu$m, more preferably less than 100 $\mu$m.

The heat expandable thermoplastic particle is normally prepared by suspension polymerisation. A general description of some techniques that can be employed and a detailed description of various compositions that are useful as heat expandable thermoplastic particles can be found in U.S. Pat. Nos. 3,615,972 and 4,483,889, incorporated herein by reference. Examples of commercially available heat expandable thermoplastic particles are those marketed under the tradename EXPANCEL and MICROPEARL. The latter comprises a wall of a methacrylonitrile-acrylonitrile copolymer.

Preferably, the oil and thermoplastic elastomer, prior to addition of the heat expandable particles is an oil gel. Preferably, the oil gel comprises 60%–98% by weight oil and 2%–40% by weight thermoplastic elastomer. More preferably, the amount of thermoplastic elastomer ranges from 3 to 25% by weight, even more preferably 4 to 15% by weight.

Preferably, the thermoplastic elastomer(s) is/are a block co-polymer(s).

Preferably, the block copolymer (s) in accordance with the present invention comprise(s)) at least two terminal poly (monovinylaromatic hydrocarbon) blocks and at least one internal poly(conjugated diene) block. Preferred block copolymers are selected from the group consisting of those of the formulae $A(BA)_m$ or $(AB)_nX$, $(AB)_fX$ $(A'B')_q$ or $(AB)_rX$ $(B")_s$, wherein each of A and A' independently represent a block copolymer of predominantly poly (monovinyl aromatic hydrocarbon), wherein each of B, B' and B" independently represent a block of predominantly poly(conjugated diene), wherein X represents the residue of a multivalent coupling agent, wherein n & r represent an integer>1, preferably 2 to 8, more preferably 2 to 6, in particular 2, 3 or 4, and m represents an integer$\geq$1, preferably 1 to 8, more preferably 1 to 4, in particular 1, and wherein, p, q and s$\geq$1, preferably 1 to 8, more preferably, 1 to 4, in particular 1 or 2.

Preferred monovinyl aromatic hydrocarbon monomers for use in preparing the poly(monovinyl aromatic hydrocarbon) blocks A and A' include styrene, alkyl-substituted styrene, alkoxy-substituted styrene, vinyl napthalene, and alkyl-substituted vinyl napthalene. More preferably, the monovinyl aromatic hydrocarbons are styrene and/or alkyl-substituted styrene, in particular styrene. The alkyl or alkoxy substituents may typically comprise from 1 to 6 carbon atoms, preferably from 1 to 4 carbon atoms. The number of alkyl or alkoxy substituents per molecule, if present, may range from 1 to 3, and is preferably one.

Preferred conjugated diene monomers for use in preparing the poly(conjugated diene) blocks B, B' and B" include those conjugated dienes containing from 4 to 24 carbon atoms such as 1,3-butadiene, isoprene, piperylene, methylpentadiene, 2-phenyl-1,3-butadiene, 3,4-dimethyl-1,3-hexadiene, and 4,5-diethyl-1,3-octadiene. Preferred conjugated dienes are those containing from 4 to 12 carbon atoms, more preferably from 4 to 6 carbon atoms. Isoprene and butadiene are the most preferred conjugated diene monomers for use in the present invention because of their low cost and ready availability.

More preferably, the A and A' blocks represent predominantly poly(styrene) blocks and the B, B' and B" blocks represent predominantly poly(butadiene) blocks, predominantly poly(isoprene) blocks or isoprene/butadiene copolymer blocks.

With the term "predominantly" in relation to block A and A' is meant that the said block is mainly derived from a monovinylaromatic hydrocarbon monomer (e.g. styrene) and up to 20% by weight of another monovinylaromatic hydrocarbon monomer (e.g. a-methylstyrene), preferably up to 10% by weight; or up to 10% by weight of a conjugated diene monomer (e.g. butadiene and/or isoprene), preferably up to 5% by weight.

With the term "predominantly" in relation to block B, B' and B" is meant that the said block is mainly derived from a conjugated diene monomer or a mixture of two or more, preferably two, conjugated diene monomers and up to 10% by weight of a monovinylaromatic hydrocarbon monomer, preferably up to 5% by weight.

Multivalent coupling agents to be used include those commonly known in the art.

Examples of suitable multivalent coupling agents contain from 2 to 8, preferably 2 to 6, more preferably 2, 3 or 4 functional groups.

It has been found that the coupling efficiency to multivalent coupling agents having more than 3 functional groups can be rather low due to steric hindrance.

In order to avoid such steric hindrance when coupling the $(AB)_n$ arms that on average at least one coupling site (functional group) of the multivalent coupling agent remains uncoupled to an AB arm, it may be desired to use AB arms wherein the end part of polymer block B, B' and B" to be coupled to the multivalent coupling agent is substantially linear. This end part, if present, typically constitutes not more than 5% by weight of the total polymer block B, B' and B". Thus, if polymer block B, B' and B" is predominantly poly(isoprene), it may be desired that the end part to be coupled to the multivalent coupling agent consists of e.g. polybutadiene, which preferably has been polymerised in 1,4 fashion.

Most preferably, the applied block copolymer has the structure ABA.

More preferably, the block copolymers contain pure poly (styrene), and pure poly(isoprene), pure poly(butadiene) blocks or copolymer blocks of isoprene and butadiene.

Block copolymers and selectively hydrogenated block copolymers comprising at least one, preferably at least two, poly(monovinylaromatic hydrocarbon) block(s) and at least one poly(conjugated diene) block, are well known in the art and available commercially.

The block copolymers can be made by anionic polymerisation with an alkali metal initiator such as sec-butyllithium as disclosed for instance in U.S. Pat. No. 4,764,572, U.S. Pat. No. 3,231,635, U.S. Pat No. 3,700,633, and U.S. Pat. No. 5,194,530.

The poly(conjugated diene) block(s) of the block copolymer may be selectively hydrogenated, typically to a residual ethylenic unsaturation of at most 20%, more preferably at most 5%, and most preferably at most 2% of its original unsaturation content prior to hydrogenation. Preferably, the block copolymers to be used in the compositions according to the invention are selectively hydrogenated. Hydrogenation may be effected selectively as disclosed in U.S. Pat. Reissue No. 27,145. The hydrogenation of these polymers and copolymers may be carried out by a variety of well established processes including hydrogenation in the presence of such catalysts as Raney Nickel, noble metals such as platinum and palladium, soluble transition metal catalysts and titanium catalysts as in U.S. Pat. No. 5,039,755. The polymers may have different diene blocks and these diene blocks may be selectively hydrogenated as described in U.S. Pat. No. 5,299,464. As set out above, the ethylenic unsaturation in the block copolymers may be removed by selective hydrogenation. In addition, it is also possible to selectively remove the ethylenic unsaturation in some arms whilst leaving the ethylenic unsaturation in other arms intact as disclosed for example in EP 0540109, 0653453 and 0653449.

The poly(monovinyl-aromatic hydrocarbon) blocks A and A' preferably have a weight average molecular weight in the range from 3000 to 100,000 g/mol, more preferably from 5,000 to 40,000 g/mol. The poly(conjugated diene) blocks B, B' and B" preferably have a weight average molecular weight in the range of from 10,000 to 250,000 g/mol, more preferably in the range of from 40,000 to 200,000 g/mol. The weight average molecular weight can be determined by gel permeation chromatography using polystyrene calibration standards (ASTM D 3536).

The vinyl content of (hydrogenated) poly(butadiene) block(s) is preferably in the range from 25 to 75 mol%, more preferably 25 to 65 mol%, even more preferably 35 to 55 mol%. The vinyl content originates from 1,2 polymerisation rather than 1,4 polymerisation of butadiene.

The vinyl content of (hydrogenated) poly(isoprene) block (s) may vary within wide limits and is typically in the range from 0 to 75% mol, preferably 0 to 20% mol.

The block copolymer to be used according to the present invention, is normally containing polymerised vinyl aromatic monomers in an amount of from 10 to 60% by weight and preferably from 15 to 45% by weight.

The weight average molecular weight of the total block copolymer will normally be in the range of from 15,000 to 600,000 g/mol and preferably in the range of from 40,000 to 300,000 g/mol, most preferably at least 90,000 to 300,000 g/mol.

According to one embodiment, a functionalised block copolymer is used, preferably a functionalised, selectively hydrogenated block copolymer, having at least two predominantly poly(monovinyl aromatic hydrocarbon) blocks and at least one predominantly poly(conjugated diene) block wherein the residual ethylenic unsaturation is at most 5% and preferably at most 2%, said block copolymer being functionalised by means of introduced polar groups such as carboxyl, carboxylic acid, acid anhydride, amide, amine, and epoxy.

Functionalised selectively hydrogenated block copolymers may be prepared by methods known from eg European patents 0085115, 0103148, 0215501, 0216347, 0262691, European patent application nos. 0349085, 0450694, 0458379 and U.S. Pat. Nos. 4174358, 4429076, 4427828, 4628072, 4657971, 4844471. Preferably, functionalised hydrogenated block tri-copolymers component(s) are used of the formula A-B-C, wherein the blocks A and C being the same or different, have been derived from predominantly styrene and wherein the B block have been derived from predominantly butadiene or isoprene, the block B being selectively hydrogenated and grafted with preferably an unsaturated acid in the presence of an organic peroxide, the unsaturated acid being grafted in an amount of up to 5 wt % and preferably in an amount of from 0.5 wt % to 2 wt %. More preferably the hydrogenated block copolymers have been grafted with a diacid and most preferably with maleic acid.

According to more preferred embodiments ABC block copolymers are used as the selectively hydrogenated components, wherein A and C are about the same, have been derived from substantially pure styrene, and have weight average molecular weights in the range of from 3000 to 60,000 wherein the block B prior to hydrogenation has been derived from substantially pure 1,3 butadiene and has a weight average molecular weight in the range of from 10,000 to 150,000 and wherein the blocks A and C constitute from 10 to 40 wt % of the total block copolymer weight.

As examples of suitable block copolymers can be mentioned KRATON GRP-6917, KRATON GRP-6919, KRATON DKX-222, KRATON FG-1901, KRATON FG-1921, KRATON FG-1924, KRATON G-1651, KRATON G-1652, KRATON G-1654, KRATON G-1657, KRATON G-1650, KRATON D-1101, KRATON D-1102, KRATON D-1107, KRATON D-1111, KRATON D-1116, KRATON D-1117, KRATON D-1118, KRATON D-1122, KRATON D-1135X, KRATON D-1184, KRATON D-1144X, KRATON D-1300X, KRATON D-4141, KRATON D-4262, KRATON D-4240, KRATON D-1186 and KRATON D-4158 (KRATON is a trademark). Preferred block copolymers have molecular weights which are not so high as to have high viscosity at the particle dispersion temperature, thus preventing homogenous dispersion and, preferably, the viscosity of the block copolymer is not so low that foamed product is weak and lacks physical integrity.

Examples of oil suitable for use in the oil gel composition include petroleum-derived oils, synthetic oils such as oils prepared by a Fischer-Tropsch synthesis, olefin oligomers as well as vegetable and animal oil and their derivatives.

The petroleum derived oils which may be employed contain only a minor proportion of aromatic hydrocarbons (preferably less than 30% and, more particularly, less than 15% by weight of the oil). Alternatively, the oil may be totally non-aromatic.

Vegetable and animal oils include glyceryl esters of fatty acids and polymerisation products thereof.

The olefin oligomers are typically oligomers of $C_2$ to $C_{12}$ olefin monomers, preferably $C_2$ to $C_6$ olefin monomers. Examples of suitable olefin oligomers include poly (butylene), poly(dodecene), hydrogenated poly(isoprene), hydrogenated poly(butadiene), hydrogenated poly (piperylene) and hydrogenated copolymers of piperylene and isoprene. The olefin oligomers typically have weight average molecular weights in the range from 350 to 35,000 g/mol, preferably from 500 to 10,000 g/mol. An example of a suitable commercial oil is Ondina N68 (Ondina is a trademark).

According to a further aspect, the present invention relates to compounds comprising the pre-foam composition and one or more additives known to those skilled in the art, such as polyolefins, poly(conjugated diene) block-compatible tackifying resins, poly(monovinylaromatic hydrocarbon) block-compatible resins, fillers, stabilizers and/or solvents.

Examples of suitable polyolefins include crystalline and elastomeric polyolefins.

In particular, preferred polyolefins include polyethylene, polypropylene, polybutylene, including ethylene copolymers, propylene copolymers and butylene copolymers. Blends of two or more of the polyolefins may be utilized.

The polyolefin can also be a metallocene polyolefin, that is a polyolefin produced with a metallocene catalyst, such as for example described in U.S. Pat. Nos. 5,322,728 and 5,272,236.

Typically, metallocene polyolefins are copolymers of ethylene and 8 to 30% by weight of an α-olefin comonomer having from 4 to 12 carbon atoms.

In addition to, or instead of the above described polyolefins, one or more poly(conjugated diene) block-compatible tackifying resins may be used.

Examples of tackifying resins useful in the compositions of this invention include hydrocarbon resins, synthetic polyterpenes, rosin esters and natural terpenes. Preferably, the tackifying resins to be used are semi-solid or solid at ambient temperatures, and soften or become liquid, that is, have a ring and ball softening point (ASTM E 28-58T), at temperatures typically ranging from 70° C. to 150° C., more preferably from 85° C. to 120° C. Such tackifying resins are often referred to as primary tackifying resins.

Exemplary of the primary tackifying resins are (1) natural and modified rosins such as gum rosin, wood rosin, tall oil rosin, distilled rosin, hydrogenated rosin, dimerized rosin, and polymerised rosin; (2) glycerol and pentaerythritol esters of natural and modified rosins such as, for example, the glycerol ester of pale, wood rosin, the glycerol ester of hydrogenated rosin, the glycerol ester of polymerised rosin, the pentaerythritol ester of hydrogenated rosin, and the phenolic-modified pentaerythritol ester of rosin; (3) copolymers and terpolymers of natured terpenes, eg styrene/terpene and alpha methyl styrene/terpene; (4) polyterpene resins the latter polyterpene resins generally resulting from the polymerisation of terpene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof such as, for example, the resin product resulting form the condensation, in an acidic medium, of a bicyclic terpene and a phenol; (6) aliphatic petroleum hydrocarbon resins; the latter resins resulting from the polymerisation of monomers consisting primarily of olefins and diolefins; also included are the hydrogenated aliphatic petroleum hydrocarbon resins (7). Mixed aromatic and aliphatic paraffin hydrocarbon resins, and the hydrogenated derivatives thereof; (8) aromatic modified alicyclic petroleum resins and the hydrogenated derivatives thereof; and (9) alicyclic petroleum hydrocarbon resins and the hydrogenated derivatives thereof. The preferred primary tackifying resins for use in the practice of this invention are represented by sub-paragraphs (1), (6), (7), (8), and (9), supra.

If desired a secondary tackifying resin can be used to reduce viscosity and/or improve tack properties respectively.

Secondary tackifying resins are liquid at ambient temperature, that is 50° C. or less. Suitable secondary tackifying resins are typically selected from the same classes (1) to (9) of primary tackifying resins, supra. Preferably, the secondary tackifying resin is selected from the class (1), (6), (7), (8) and (9), supra.

If the block copolymer is selectively hydrogenated, the tackifying resin is preferably hydrogenated as well.

It may be desirable to include one or more poly (monovinylaromatic hydrocarbon) block-compatible resins in the compounds according to the present invention. Such resins include coumarone-indene resins, polyalpha-methylstyrene resins, vinyl toluene-alpha-methyl styrene copolymers, and polyindene resins. For the purposes of this specification, the monovinyl aromatic hydrocarbon based thermoplastic elastomer composition of this invention is not regarded as a poly(monovinyl aromatic hydrocarbon) block-compatible resin.

A variety of solvents or solvent blends known to those skilled in the art can be used to improve processing of the oil based systems at ambient temperatures. Solvents or solvent blends that dissolve the polystyrene domains will weaken the network and allow easier processing, specifically at ambient temperatures. Examples of such solvents are toluene, xylene, cyclohexane, methane ethyl ketone or combinations of these solvents.

Optionally, a filler is added to the (foamed) oil gel composition.

A wide variety of fillers can be used including carbonates such as calcium carbonate, refractory oxides such as silica, titania, zinc oxide, silicates such as clays and talc, soot, graphite, and fibres such as glass fibres.

Optionally, a stabilizer is added to the (foamed) oil gel composition. A variety of stabilizers are known to those skilled in the art and are commercially available.

The stabiliser which may be used in accordance with the practice of the present invention includes hindered phenol derivatives, hindered amine or triazine derivatives or phosphorous and/or sulphur-containing hindered compounds, or mixtures thereof.

Examples of suitable stabilizers are those disclosed in European patent specification No. 0659787.

Preferred representatives of stabilizers are pentaerythrityl-tetrakis(3,5-di-tert-butyl-4-hydroxy-hydrocinnamate) (IRGANOX 1010); octadecyl ester of 3,5-bis (1,1-di-methylethyl)-4-hydroxy benzene propanoic acid (IRGANOX 1076); 2,4-bis (n-octylthio)-6-(4-hydroxy-3,5-di-tert-butylanilino)-1,3,5-triazine (IRGANOX 565); 2-tert-butyl-6-(3-tert-butyl-2'-hydroxy-5-methylbenzyl)-4-methylphenyl acrylate (SUMILIZER GM); tris (nonylphenyl)phosphite; tris (mixed mono- and di-phenyl)-phosphite; bis (2,4-di-tert-butylphenyl)-pentaerythritol diphosphite (ULTRANOX 626); distearyl pentaerythritol diphosphite (WESTON 618); styrenated diphenylamine (NAUGARD 445); N-1,3-dimethylbutyl-N'-phenyl-paraphenylenediamine (SUMILIZER 116 PPD); tris (2,4-di-tert-butylphenyl)phosphite (IRGAFOS 168); 4,4-butylidene-bis-(3-methyl-6-tert-butylphenol) (SUMILIZER BBMS); as well as epoxy resins such as EPON 1004 and dilaurylthiodipropionate (IRGANOX PS 800), or combinations thereof. IRGANOX, EPON, SUMILIZER, ULTRANOX, WESTON, NAUGARD and IRGAFOS are trade-marks.

The heat expandable thermoplastic particles of the present invention are, preferably, heat expandable hollow particles comprising a thermoplastic shell and an expandable gas of volatile liquid encapsulated by the said shell. Other variations and modifications and details relating to the materials forming the heat expandable thermoplastic particles of the invention can be ascertained from EP0717091A2 page 3 line 39–page 4 line 46 which is imported herein by reference.

Preferably, the density of the foam formed in accordance with the invention is between 600 kg/M$^3$ and 300 kg/m$^3$.

The composition of the present invention may be blended under any suitable conditions including stir blending and agitation. Furthermore, in the case of pre-foam compositions, the expansion and/or mixing of the particles may take place under known industrial heating processes such as extrusion, injection moulding etc.

In the case of oil gel foams, the foamed oil gel in accordance with the present invention advantageously has the properties of low density and low tack although the retention of a small degree of tack which is found in the foams may provide advantageous properties where a small amount of tackiness is required. On the other hand, properties of the expanded oil gel could also be used for applications where lower tack and lower density is required.

In addition to block copolymers, other thermoplastic elastomer(s) useful in the present invention include polyurethanes, polyesters, silicone rubbers and thermoplastic elastomer gelling agents.

Advantageously, due to the use of thermoplastic elastomer(s), the products of the present invention may be recyclable. Thus, in one aspect, the foam may be reheated to form a melt and the hollow particles may be redistributed or further particles may be added to replenish the melt or the particles and the melt may be separated by suitable separation techniques so that the thermoplastic elastomer can be recycled for further use.

Thus, according to a still further aspect of the present invention, there is provided a recyclable foam comprising a composition in accordance with any aspect of the present invention.

The compositions of the present invention may be used in sealants, carpet backing and other shock absorbing applications such as automobile bumpers, shoe insoles, adhesives and coatings. The foam of the present invention could be used in gasketing systems, particularly where the injection of a low viscosity melt is required followed by heat treating. This is particularly advantageous in the automobile industry where pre-foam melt can be injected by suitable equipment directly onto the car body part and subsequently heated to expand the hollow particles. Melt injection of gasketing material encourages much greater freedom among design engineers who wish to create complex shapes and configurations for doors, lights, bonnets etc.

The invention will now be described with reference to examples.

EXAMPLE 1–2

Ondina N68 oil, 94% w, and Kraton G—1652, a selectively hydrogenated styrene-butadiene-styrene block copolymer, 6% w, form a binary system which becomes a viscous, homogeneous liquid above 100° C. and remains homogeneous upon cooling into a solid (oil gel) at room temperature. The foaming agent microspheres, 2 and 4% w Expancel 091-80, respectively, were added at 100° C. and mixed with the oil and thermoplastic polymer for a few minutes. Once the mixture was homogeneous, the temperature was raised to cause the microspheres to expand (100–145° C.).

EXAMPLE 3–8

Ondina N68 oil, 94% w, and Kraton G—1654, a selectively hydrogenated styrene-butadiene-styrene block copolymer, 6% w, were mixed with Expancel 091-80 in concentrations of 1, 2, 3, 4, 5 & 6% by weight using the procedure as outlined in examples 1 & 2 except that the mixing took place above 118–126° C. due to the higher viscosity of the binary system. Efficient mixing leads to an acceptable distribution of the microspheres and migration of the microspheres during cooling is less acute due to the higher viscosity of the melt. Foam densities ranging from 0.47kg/l to 0.39 kg/l were achieved.

EXAMPLE 9–10

Ondina N68, 90% w, Kraton G—1654, 10% w and Expancel microspheres (2 and 4% w Expancel 091-80 respectively) were mixed using the same technique as described with respect to examples 3–8 above. Again, densities of 0.47 kg/l to 0.39 kg/l were achieved.

Preparation of Binary System

Oil gels were prepared by dissolving the block copolymer (KRATON G 1652 or G 1654) in the oil (Ondina N68), pre-heated to 140° C. The block copolymer was added gradually under moderate mixing. Total mixing time was 2 hours. The oil gels were then poured into an open mould (dimensions 15×15×0.2 cm) and placed in an oven at 80° C. under vacuum for 30 minutes. Oil gel sheets were pealed out of the mould after cooling to room temperature. Test dumbbells were cut from the sheets.

To prepare the expanded oil gels, pure oil gels that were made as above were re-melted to 120° C. and the Expancel microspheres were added under moderate mixing. Mixing time was 15 minutes. The resultant mixture was then poured into an open mould (dimensions 15×15×0.2 cm) and placed in an oven at 180° C. for 15 minutes. Expanded sheets were demoulded after cooling to room temperature. Test dumbbells were cut from these sheets.

To assess the influence of processing or heat history, expanded gels were prepared as follows. Pure oil gels that were made as above were remelted to 120° C. and Expancel microspheres were added under moderate mixing. Mixing time was 15 minutes. The temperature was then raised to 160° C. and the mixture was kept at this temperature for approximately 10 minutes. The resulting foamed oil gel showed a marked increase in viscosity and is released from the mixing equipment as lumps. These lumps are then put into an open mould (dimension 15×15×0.2 cm) and compression moulded at 120° C. Test dumbbells were cut from these compression moulded sheets.

Initial testing was carried out with gels based on commercially available block copolymer KRATON G 1652, example 1 and 2, because of the low viscosity and easier processing of the systems. These gels form foams that are relatively weak and testing property changes apart from density is difficult. The foamed gels obtained remain relatively weak even at block copolymer concentrations of 10% w. Gels based on high molecular weight block copolymers such as commercially available grade KRATON G 1651, show excellent mechanical properties when block copolymer concentration is above 6% w but these gels show a high viscosity which leads to difficulties in carrying out homogeneous dispersion of the Expancel microspheres at least with laboratory equipment. KRATON G 1654, Examples 3–10, is easier to process, having a viscosity which lies between G 1651 and G 1652 and also shows good mechanical properties.

In Examples 3–10, foaming was carried out using Expancel 091–80 with an expansion onset temperature of 118–126° C. and a maximum expansion temperature of 171–181° C. Similar results may be obtained with other Expancel grades and grade selection should largely be based on production/process considerations.

Drop Point

The drop point, the temperature at which the gel passes from a semisolid to the liquid state, was measured using a Mettler FP Thermosystem. The method is similar to ASTM D3104-82 except that the cup has a bottom hole of 4.2-mm diameter and the temperature is raised at 5° C. per minute.

Upper Service Temperature

The upper service temperature was measured on a Perkin Elmer TMA 7 with a temperature increase of 5° C. per minute. The initial force applied on the sample was varied from 10 to 100 mN.

As can be seen from table 1, the density of an oil gel is decreased by 50% at an Expancel loading of only 3% w. With only 1% w, Expancel already produces a decrease in density of about 30%. Upon foaming, the gel samples turn from light yellow to white. Gels without Expancel are transparent and show a slight yellow haze when 1–5% w non-expanded Expancel is mixed in. The foamed samples show a lower tack on the outer surfaces and very low to no tack on freshly cut surfaces. However, this difference in tack is difficult to measure because the tack on the outer surface is itself at the limit of measurement. Foamed samples exhibit a lower tensile strength and elongation but an increase in tensile modulus. Also, as indicated in table 1, there is a marked increase in drop point and upper service temperature upon foaming.

Figure 2:
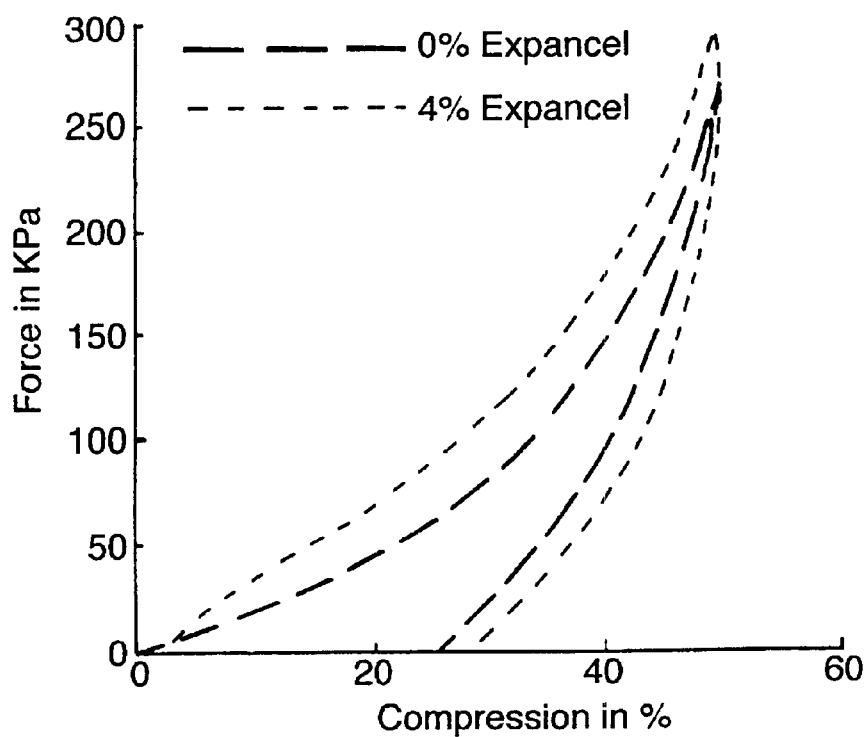

The compression forces and hysteresis values at different compression ratios are presented in tables 3–5 and FIGS. 1 & 2. The gel, upon foaming, gradually becomes harder and hysteresis increases. However, the difference in hysteresis at a compression of 10% and a compression of 30% is considerable lower for gels formed with at least 2% w Expancel microspheres. In other words, the compression behaviour compared to a non-foamed gel is more uniform in the foamed gels. The compression force at low compression values markedly increases with increased microsphere loading. At higher compression values, compression forces still increase with increasing microsphere loading but differences become less marked.

EXAMPLE 11

The following samples were prepared using the same technique as described with respect to Examples 3–8.

Sample A=an oil gel containing 10% by weight block copolymer (KRATON G 1654) and 90% by weight oil (ONDINA N68).

Sample B=an oil gel containing 20% by weight block copolymer (KRATON G 1654) and 80% by weight oil (ONDINA N68).

Sample C=a foam (expanded oil gel) having substantially the composition of sample A (96% by weight), but containing in addition 4% by weight of heat-expanded thermoplastic particles (EXPANCEL 091-80).

Sample D=a foam (expanded oil gel) having substantially the composition of sample B (96% by weight), but containing in addition 4% by weight of heat-expanded thermoplastic particles (EXPANCEL 091-80).

The viscosity of the samples was measured on a Haake RS100 CS Rheometer. The samples were inserted between parallel plates with a diameter of 35 mm. The gap opening was adjusted to 1 mm. Measurements were performed at a frequency of 0.1 Hz and a stress level of 10 Pa.

FIG. 3 shows the viscosity/temperature curves (in Pa.s/° C.) for samples A–D. It can be seen that the foams have a much higher viscosity over the measured temperature range.

All these property changes reflect the fact that upon foaming the oil gels show more and more typical plastic compound properties and no longer resemble an oil gel.

Oils

The following oils are suitable for use as oils in the present invention. Preferably, the oils used are those which associate primarily with the rubber mid-block of a triblock copolymer, that is those which associate primarily with a poly(conjugated diene) block rather than a poly(monovinyl aromatic hydrocarbon) block.

| Oil | Description | Supplier |
| --- | --- | --- |
| Ondina N68 | 42% naphthenic, 58% paraffinic | SHELL |
| Shellflex 371 | 53% naphthenic, 46% paraffinic, 1% aromatic | SHELL |
| Catenex SM942 | 30% N, 68% P, 2% A | SHELL |
| Catenex 945 | 42% N, 53% P, 5% A | SHELL |
| Kaydol | 45% N, 55% P | Witco |
| Indopol H100 | Polybutene | Amoco |

% is % by weight
N is napthenic; p is paraffinic and A is aromatic

In addition, extender liquids may be used, for example, poly(alpha-olefin) extender liquids such as Durasyn 168 from Ethyl Corporation.

Optionally, waxes may be used as additives to these oil gels. Suitable waxes are mainly low molecular weight polyethylenes. Suitable grades are e.g. supplied by Allied under the AC trade name, by Quantum Chemical under the Petrothene trade name and by Eastman Chemical Products under the Epolene trade name. The content of waxes is usually between 2 and 10% w of the total composition.

TABLE 1

Properties of foam, expanded oil gel, containing 10% w KRATON G1654 thermoplastic elastomer in Ondina N68 oil

| % w Expancel | Density g/ml | Drop Point ° C. | Upper Service Temperature ° C. |
| --- | --- | --- | --- |
| 0 | 0.84 | 135 | 76 |
| 1 | 0.59 | 145 | 78 |
| 2 | 0.50 | 153 | 79 |
| 3 | 0.43 | 192 | 85 |
| 4 | 0.43 | 196 | 84 |

TABLE 2

Properties of foam, expanded oil gel, containing 10% w KRATON G1654 thermoplastic elastomer in Ondina N68 oil

| % w Expancel | Oil bleed out | Tensile Strength MPa | Elongation % | 300% Modulus MPa |
| --- | --- | --- | --- | --- |
| 0 | 3 | 0.72 | 1630 | 0.04 |
| 1 | 2 | 0.25 | 1280 | 0.07 |
| 2 | 2 | 0.17 | 1060 | 0.10 |
| 3 | 2 | 0.11 | 560 | 0.11 |
| 4 | 2 | 0.12 | 820 | 0.10 |

TABLE 3

Hysteresis upon compression of a 10% w G1654 based foam, maximum compression 10%

| % w Expancel | Force at 10% compression | Hysteresis |
| --- | --- | --- |
| 0 | 17 | 27 |
| 1 | 10 | 40 |
| 2 | 25 | 62 |
| 3 | 26 | 69 |
| 4 | 30 | 69 |

TABLE 4

Hysteresis upon compression of a 10% w G1654 based foam, maximum compression 30%

| % w Expancel | Force at 10% compression | Force at 30% compression | Hysteresis |
| --- | --- | --- | --- |
| 0 | 17 | 76 | 42 |
| 1 | 16 | 80 | 53 |
| 2 | 24 | 105 | 62 |
| 3 | 23 | 94 | 65 |
| 4 | 31 | 104 | 72 |

TABLE 5

Hysteresis upon compression of a 10% w G1654 based foam, maximum compression 50%

| % w Expancel | Force at 10% compression | Force at 30% compression | Force at 50% compression | Hystereis |
| --- | --- | --- | --- | --- |
| 0 | 17 | 77 | 263 | 48 |
| 1 | 6 | 76 | 256 | 65 |
| 2 | 26 | 98 | 291 | 68 |
| 3 | 26 | 94 | 267 | 70 |
| 4 | 35 | 110 | 293 | 73 |

What is claimed is:

1. A foam production process comprising:
   forming a pre-foam composition comprising an oil, a thermoplastic elastomer, and heat expandable thermoplastic particles encapsulating a heat expandable gas or a liquified gas; and
   heat treating the prefoam composition to produce a foam, wherein the foam retains the thermoplastic elastomer.

2. The process according to claim 1, wherein the oil is present in an amount of 54–97% by weight of the prefoam composition.

3. The process according to claim 1, wherein the prefoam composition forms a melt.

4. The process according to claim 1, wherein the thermoplastic elastomer is present in an amount of 2–40% by weight of the prefoam composition.

5. The process according to claim 1, wherein the particles are present in an amount of 0.5–6% by weight of the composition.

6. The process according to claim 1, wherein a tackifying resin, a wax, a filler, or a poly(monovinyl aromatic hydrocarbon) block compatible resin is mixed with the prefoam composition.

7. The process according to claim 1, wherein the thermoplastic elastomer comprises a block copolymer.

8. A foam comprising:
   an oil and a thermoplastic elastomer, wherein heat expanded thermoplastic particles encapsulate a gas.

9. Articles containing a foam according to claim 8.

10. Adhesives, sealants or coatings comprising a foam according to claim 8.

11. The process of claim 1, wherein the thermoplastic elastomer comprises a selectively hydrogenated styrene-butadiene-styrene block copolymer.

12. The process of claim 1, wherein the thermoplastic elastomer comprises a block copolymer with less than 2% residual ethylenic unsaturation.

13. The process of claim 1, wherein the heat expandable thermoplastic particles include a shell comprising poly(vinylidene chloride-co-acrylonitrile).

14. The process of claim 1, wherein the liquified gas encapsulated within the heat expandable thermoplastic particles comprise n-butane or n-pentane.

15. The process of claim 1, wherein a tackifying resin, a wax, a filler, or a poly(monovinyl aromatic hydrocarbon) block compatible resin is mixed with the pre-foam composition prior to expansion of the particles.

16. The process of claim 1, wherein the heat treating of the pre-foam composition occurs between 125° C. and 181° C.

* * * * *